United States Patent [19]

Horlacher

[11] 4,394,097
[45] Jul. 19, 1983

[54] RETAINING APPARATUS

[75] Inventor: Wilhelm H. Horlacher, Hartford, Conn.

[73] Assignee: Honeywell, Inc., Minneapolis, Minn.

[21] Appl. No.: 253,435

[22] Filed: Apr. 13, 1981

[51] Int. Cl.³ .......................... B25G 3/02; F16D 1/00
[52] U.S. Cl. .................................. 403/360; 403/376;
403/259; 403/263; 403/405
[58] Field of Search ............... 403/360, 196, 197, 201,
403/376, 259, 263

[56] References Cited

U.S. PATENT DOCUMENTS

| | | | |
|---|---|---|---|
| 276,415 | 4/1883 | Hurlbut | 174/167 |
| 1,025,706 | 5/1912 | McCloy et al. | 430/197 X |
| 1,062,039 | 5/1913 | Schimmel | 411/268 |
| 1,794,931 | 3/1931 | Tiefenbacher | 285/205 |
| 2,194,961 | 3/1940 | Walker | 403/296 |
| 2,885,232 | 5/1959 | Eberly | 403/202 |
| 3,262,673 | 7/1966 | Seeley | 251/357 |
| 3,287,031 | 11/1966 | Simmons et al. | 403/201 X |
| 3,462,121 | 8/1969 | Smull | 251/357 |
| 3,824,135 | 6/1974 | Hetzer et al. | 148/413 |
| 4,150,250 | 4/1979 | Lundeberg | 403/197 |

*Primary Examiner*—Wayne L. Shedd
*Attorney, Agent, or Firm*—M. J. Halista

[57] ABSTRACT

Mounting apparatus for retaining a cylindrical member with respect to a first member by providing a circumferential groove only part way around the cylindrical member to extend through the aperture in the first member and providing an externally threaded clip member having an internal cavity to fit over the end of the cylindrical member with circumferential convex inwardly extending ridges on the clip member fitting within the grooves on the cylindrical member preventing rotation of the clip member and a nut member internally threaded to cooperate with the clip member in holding the cylindrical member within the aperture of the first member.

4 Claims, 2 Drawing Figures

RETAINING APPARATUS

BACKGROUND OF THE INVENTION

It is often desirable to be able to fasten a cylindrical member within a cylindrical aperture of a piece of equipment to be retained thereto. One common way of retaining the parts together involves the use of an externally threaded clip which is mounted on the end of the cylinder and a internally threaded nut which cooperates with the clip to bear against the surface of the part being retained after threading on the clip member. Difficulties have been encountered with such apparatus by virtue of the fact that the clip member tends to rotate on the cylinder as the nut is being threaded thereon preventing the nut from moving against the part being retained. In U.S. Pat. No. 3,262,673, issued to S. B. Seeley on July 26, 1966, one solution to this problem is presented in the form of a stopper having a threaded bore and a stopper rod having threaded sleeve sections mounted on the rod and adapted to be screwed into the bore. The rod is shown having a reduced section adjacent its lower end part way around the circumference of the rod so as to form an annular abutment shoulder. In order to secure the rod to the stopper, a pair of split sleeve sections are mounted to fit within the reduced portion on the rod and to encircle the rod. When the rod and stopper are assembled, the annular abutment prevents rotation of the sleeve sections. The Seeley invention presents several difficulties since the reduced portions of the rod have to be machined in a time consuming and costly manner and the possibility exists of assembling the split sleeves upside down or leaving one of the sleeve portions out during assembly.

SUMMARY OF THE INVENTION

The present invention overcomes the problems of the prior art by providing an easy-to-produce groove near the end of the cylindrical member extending only part way around the circumference of the cylindrical member to form an abutment where the groove ends and by providing a one-piece externally-threaded clip member having an internal aperture or cavity adapted to fit over the end of the cylindrical member. Circumferential convex ridges adapted to fit within the groove on the cylindrical member are provided extending inwardly on the edge of the internal cavity. A pair of slots are cut through the convex ridges to form ends of the ridges. The groove may be formed by two die-halves deforming the cylindrical member without complex machining and the convex ridges may be formed by injection molding with the flexibility of the clip material allowing easy removal from the mold. Since there are no split halves to assemble, there is no possibility of omitting a part of the clip member or assembling it in an upside down fashion. A nut is then threaded over the clip member which is prevented from turning with respect to the cylindrical member by the cooperation of the ends of the convex ridges on the clip member engaging the abutments formed by the end grooves of the cylindrical member. Accordingly the assembly may be mounted on a structure to which it is to be retained without difficulty.

DETAILED DESCRIPTION OF THE PREFERRED EMBODIMENTS

Figure 1:
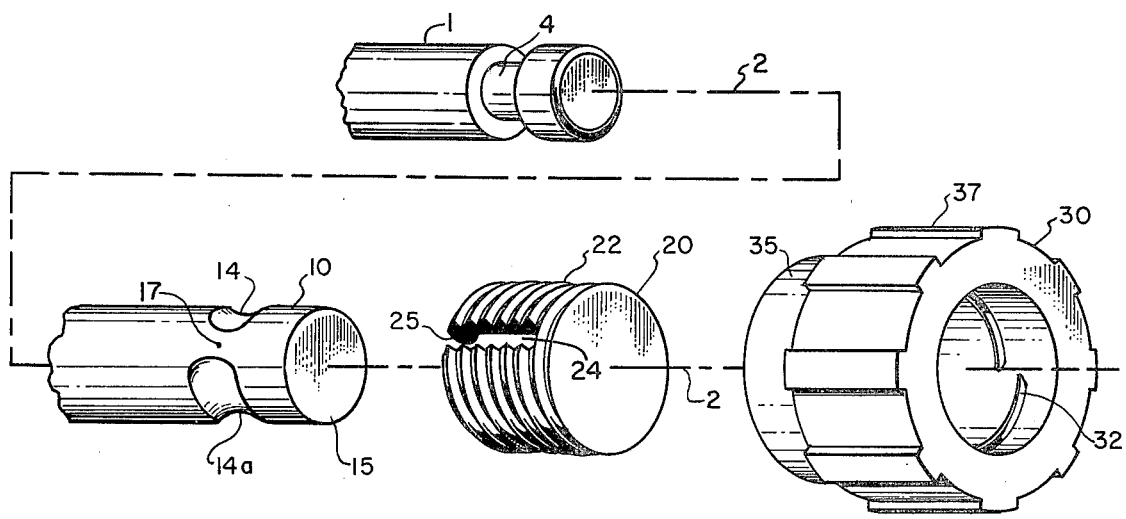
FIG. 1 is an exploded view of the cylindrical member, the clip member and the nut of the present invention.

In FIG. 1, a cylindrical insert 1 is shown lying along an axis 2 and has, near the right end portion thereof, a circumferential groove 4 machined therein. Insert 1 is adapted to fit within a hollow cylindrical member 10 which is shown lying along axis 2. After insertion of insert 1 into member 10, a pair of partially circumferential grooves 14 and 14a may be made by deforming the wall of member 10 with two die-halves so that they extend into the groove 4 of insert 1. Insert 1 and member 10 may be used to mount equipment with respect to a housing by fastening the member 10 within an aperture in the housing, e.g., the member 10 may be used as a stud on a small valve casing which is to be mounted and secured within a housing. The partially circumferential grooves are shown comprising two separate groove portions 14 and 14a each extending part way around the circumference of the cylindrical member 10 but not completely around and the portions where the grooves are not formed provide an abutment 17 on both sides of member 10. Alternately, groove 14 may be a single groove extending a substantial part of the way around the circumference of cylinder 10 but not completely leaving a single abutment 10.

A clip member 20 is shown in FIG. 1 having an externally threaded portion 22 and an internal aperture or cavity formed in the end of member 20 that is out of view in FIG. 1. The cavity is sized so as to be a snap fit over the end 15 of cylinder 10. A longitudinal cutout or slot 24 may be cut through the threads 22 of clip 20 and into the internal cavity with a similar slot positioned on the other side so as to increase the flexibility of clip 20 and permit it to be snapped over the end of cylinder 10. Within the internal cavity, and near the left end thereof, are formed convex ridges 25 extending inwardly circumferentially around the interior cavity of clip 20 and adapted to snap into the grooves 14 and 14a when member 10 is snapped into the internal cavity of clip 20. The ends of ridges 25, where the slot 24 is cut, cooperate with the abuttments 17 on member 10 to prevent rotation of the clip 20 after it is mounted on the member 10.

A nut member 30 is shown in FIG. 1 having an internal thread at 32 adapted to cooperate with the external threading 22 on clip 20. Member 30 has an abutment portion 35 extending to the left in FIG. 1 whose purpose is to press against the member to be retained when the nut 30 is tightened down on the clip 20 after it is snapped over the end of cylinder 10. Suitable longitudinal ridges 37 are shown on a nut member 30 for ease in threading the nut member 30 on the clip 20.

Figure 2:
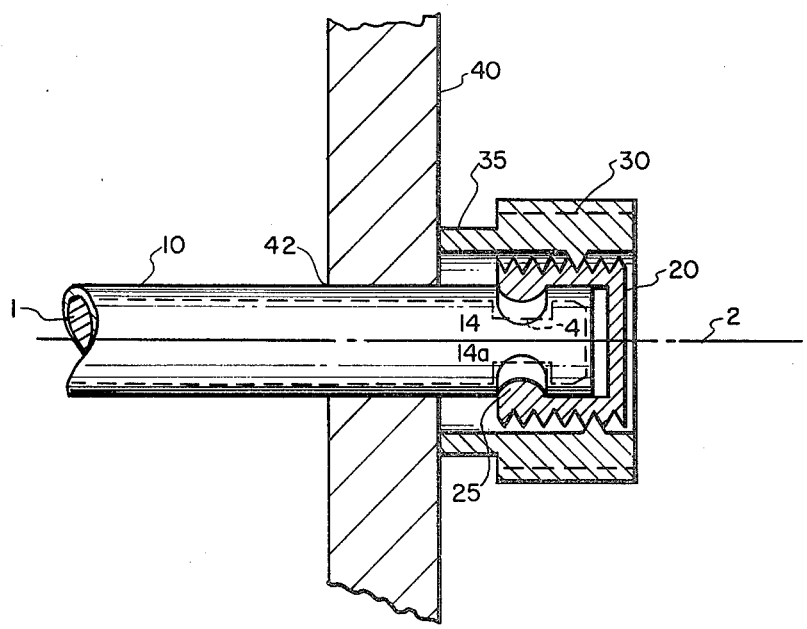
FIG. 2 is a cross-sectional view of the assembly mounted with respect to a structure on which it is to be retained.

FIG. 2 shows a retaining member or housing 40 having an aperture 42 therein of size suitable to accept the member 10 with insert 1 therein. As seen in FIG. 2, member 10 is placed through the housing 40 so that the partially circumferential grooves 14 and 14a are on the right side of the housing. The clip 20 is shown snapped on to cylinder 10 so that the convex ridges 25 fit within the grooves 14 and 14a. The nut 30 is shown in FIG. 2 threaded over the clip 20 with the abutment 35 pressing against the housing 40. It is seen that the cylindrical member 10 is thus held to housing 40 so as to prevent motion to the left in FIG. 2. In use, apparatus such as a valve will be carried by member 10 and will prevent motion of member 10 to the right in FIG. 2. Alternately, a shoulder or lip may be formed on member 10 to bear against the left side of housing 40 and prevent rightward motion.

It is seen that there has been provided a structure for mounting a cylindrical member to a second member on which it is to be retained in a simple inexpensive and straightforward manner. The nut tightens the cylindrical member to the second member without the clip turning in the process and the possibility of omitting parts or inverting parts is avoided. Many obvious modifications will occur to those skilled in the art and the invention is to be only limited by the following claims.

The embodiments of the invention in which an exclusive property or right is claimed are defined as follows:

1. A retaining assembly for use in mounting on a first member having a cylindrical aperture therein comprising:
   a cylindrical member sized to extend through the aperture in the first member, said cylindrical member having a surface groove only part way around said cylindrical member near one end thereof to form abutments where the groove ends;
   an externally threaded one-piece clip member having an inner cavity sized to snap over the end of said cylindrical member, an inner surface of the cavity having a convex partially circumferential ridge extending radially inwardly into the cavity and adapted to fit within the groove on said cylindrical member upon insertion of said cylindrical member into the cavity of said clip member to hold said clip member on the end of said cylindrical member, the ridge having an end portion which cooperates with the abutments to prevent the clip member from rotating with respect to said cylindrical members; and
   a nut member internally threaded to cooperate with the external threading of said clip member and operable to be tightened against the first member to secure said cylindrical member with respect to the first member.

2. An Assembly according to claim 1 wherein the partially circumferential groove is formed in two parts each part way around said cylindrical member to form two abutments where each of the parts end.

3. An assembly according to claim 1 wherein the partially circumferential ridge in the cavity of said clip member extend part way around the circumference to substantially the same extent that the circumferential grooves in said cylindrical member extend and form two ends where the ridges stop, the ends cooperating with the abutments to prevent rotation of the clip member with respect to the cylindrical member.

4. An assembly according to claim 1 wherein said clip member also has a pair of longitudinally extending cutouts extending into the cavity thereof to increase the flexibility of said clip member and facilitate a snap insertion of said cylindrical member into the cavity of said clip member.

* * * * *